United States Patent [19]

Innertsberger et al.

[11] 4,296,228

[45] Oct. 20, 1981

[54] ROOM TEMPERATURE CURABLE COMPOSITIONS

[75] Inventors: Ernst Innertsberger; Oswin Sommer; Erhard Bosch; Johann Müller, all of Burghausen; August Schiller, Marktl, all of Fed. Rep. of Germany

[73] Assignee: Wacker-Chemie GmbH, Munich, Fed. Rep. of Germany

[21] Appl. No.: 126,230

[22] Filed: Mar. 3, 1980

[30] Foreign Application Priority Data

Mar. 22, 1979 [DE] Fed. Rep. of Germany ....... 2911301

[51] Int. Cl.$^3$ ............................................. C08G 77/04
[52] U.S. Cl. ..................................... 528/33; 260/18 S; 525/479; 528/34; 528/35; 528/901; 528/41; 556/442
[58] Field of Search ...................... 528/33, 34, 35, 901, 528/41; 525/479; 556/442; 260/18 S

[56] References Cited

U.S. PATENT DOCUMENTS 3,296,195  1/1967  Goossens ............................ 556/442
3,886,118  5/1975  Nitzsche et al. ...................... 528/33

*Primary Examiner*—Melvyn I. Marquis

[57] ABSTRACT

Room temperature curable compositions, which can be stored under anhydrous conditions, but when exposed to atmospheric moisture at room temperature cure to an elastomer comprising a diorganopolysiloxane having terminal condensable groups, a silicon compound containing acetoxy, tert-butoxy and SiC-bonded alkyl groups and a condensation catalyst, if desired, in which at least a portion of the silicon compound containing acetoxy, tert-butoxy and SiC-bonded alkyl groups is obtained from the reaction of an alkyltriacetoxysilane and tert-butanol in aqueous acetic acid.

10 Claims, No Drawings

ROOM TEMPERATURE CURABLE COMPOSITIONS

This invention relates to curable compositions and more particularly to organopolysiloxane compositions which cure at room temperature in the presence of atmospheric moisture to form elastomers.

BACKGROUND OF THE INVENTION

Organopolysiloxane compositions which are curable at room temperature are well known in the art. For example, compositions which may be stored under anhydrous conditions, but when exposed to moisture cure to an elastomer are described in U.S. Pat. No. 3,886,118 to Nitzsche et al. These compositions are prepared by mixing a diorganopolysiloxane having terminal condensable groups with a silicon compound containing at least three condensable groups per molecule as a crosslinking agent and a condensation catalyst, if desired, in which the silicon compound is obtained from the reaction of tert-butoxyacetoxysilanes with methyltriacetoxysilane in a weight ratio of 3:7 to 1:9 at temperatures of at least 120° C.

Compared to the silicon compounds described above which contain acetoxy, tert-butoxy and SiC-bonded alkyl groups, the silicon compounds containing acetoxy, tert-butoxy and SiC-bonded alkyl groups used in this invention have the advantage that they are more readily available and they form more transparent and less colored elastomers.

Therefore, it is an object of this invention to provide an organopolysiloxane composition which is stable under anhydrous conditions. Another object of this invention is to provide an organopolysiloxane composition which is curable to an elastomer when exposed to moisture at room temperature. Still another object of this invention is to provide a silicon compound having at least three condensable groups per molecule which is readily available. A further object of this invention is to provide a silicon compound which may be used as a crosslinking agent to form transparent elastomers.

SUMMARY OF THE INVENTION

The foregoing objects and others which will become apparent from the following description are accomplished in accordance with this invention, generally speaking, by providing an organopolysiloxane composition which is stable in the absence of moisture, but cures to form an elastomer when exposed to moisture at room temperature comprising a diorganopolysiloxane having terminal condensable groups and a silicon compound containing at least three condensable groups per molecule as a crosslinking agent and a condensation catalyst, if desired, in which a portion of the silicon compound containing acetoxy, tert-butoxy and SiC-bonded alkyl groups is obtained from the reaction of an alkyltriacetoxysilane and tert-butanol in aqueous acetic acid.

DETAILED DESCRIPTION OF THE INVENTION

Diorganopolysiloxanes having terminal condensable groups which have or could have been used heretofore in the preparation of compositions which may be stored under anhydrous conditions, but when exposed to moisture at room temperature cure to form elastomers may be used in this invention. The diorganopolysiloxanes having terminal condensable groups which are generally used within the scope of this invention are represented by the general formula:

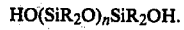

in which R represents the same or different monovalent hydrocarbon radicals, substituted monovalent hydrocarbon radicals and/or polymeric hydrocarbon radicals and n represents a number having a value of at least 10.

Although this is generally not indicated in these formulas, siloxane units other than the diorganosiloxane units ($SiR_2O$) may be present within or along the siloxane chains. Examples of such other siloxane units which may be present, mostly as impurities, are those corresponding to the formulas $RSiO_{3/2}$, $R_3SiO_{\frac{1}{2}}$ and $SiO_{4/2}$, where R is the same as above. It is preferred that siloxane units other than the diorganosiloxane units are not present in an amount of more than about 5 mole percent. Other siloxane units, such as those of the formula $OSiR_2R'SiR_2$— where R is the same as above and R' is a bivalent hydrocarbon radical, e.g., a phenyl radical, may be present in larger amounts. If desired, the hydroxyl groups shown in the above formula may be partially or entirely substituted with other condensable groups, such as acetoxy, alkoxy or alkoxyalkyleneoxy groups, such as those having the formula $CH_3OCH_2CH_2O$—. Examples of hydrocarbon radicals represented by R are alkyl radicals such as the methyl, ethyl, n-propyl, isopropyl, n-butyl and the sec-butyl radical, as well as the octadecyl radicals; alkenyl radicals such as the vinyl, allyl and oleyl radicals; aryl radicals such as the phenyl radical; alkaryl radicals such as the tolyl radical; and aralkyl radicals such as the beta-phenylethyl radical.

The substituted monovalent hydrocarbon radicals represented by R are preferably halogenated hydrocarbon radicals such as the 3,3,3-trifluoropropyl radical, chlorophenyl and bromophenyl radicals, and cyanoalkyl radicals, such as the beta-cyanoethyl radical.

Examples of substituted and unsubstituted polymeric (also referred to as "modified") hydrocarbon radicals are especially those which are obtained from the free radical polymerization of a polymerizable compound in the presence of a diorganopolysiloxane having the general formula:

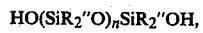

where R" represents the same or different monovalent hydrocarbon radicals or substituted monovalent hydrocarbon radicals and n is the same as above. Examples of polymerizable compounds which may be used in the free radical polymerization are vinyl acetate and/or ethylene, styrene and/or acrylic acid and/or methacrylic acid, acrylic acid esters and/or methacrylic acid esters and/or methacrylonitrile.

Because of their availability, it is preferred that at least 80 percent of the number of R and R" radicals be methyl radicals.

The diorganopolysiloxanes having terminal condensable groups may be homopolymers or copolymers. Mixtures of various diorganopolysiloxanes having terminal condensable groups may be used.

The diorganopolysiloxanes containing terminal condensable groups should preferably have a viscosity of from 100 to about 500,000 mPa·s at 25° C.

The acetoxysilanes used in the preparation of the silicon compounds of this invention which contain acetoxy, tert-butoxy, and SiC-bonded alkyl groups, are preferably methyltriacetoxysilane, ethyltriacetoxysilane, propyltriacetoxysilane or isopropyltriacetoxysilane or mixtures containing at least two of the above alkyltriacetoxysilanes.

The amount of tert-butanol employed in the reaction with the alkyltriacetoxysilane ranges from about 0.16 to 0.2 mole per mole of alkyltriacetoxysilane.

Aqueous acetic acid is preferably used in an amount of from 0.35 to 0.7 mole of water, and more preferably about 0.5 mole per mole of alkyltriacetoxysilane.

The amount of acetic acid present in the aqueous acetic acid is preferably from 0.1 and 2.0 mole $CH_3COOH$ (anhydrous) and more preferably about 0.3 mole or approximately 0.3 mole of $CH_3COOH$ (anhydrous) per mole of water.

The preparation of the silicon compounds containing acetoxy, tert-butoxy and SiC-bonded alkyl groups is preferably carried out by first mixing the alkyltriacetoxysilane with tert-butanol. The mixture thus obtained is preferably heated to a temperature of from about 25° to about 100° C. before the aqueous acetic acid is slowly added under agitation. All of the components which boil at temperatures up to 110° C. at 16 mbar are then removed by distillation.

Since this method is relatively inexpensive, it is preferred that the silicon compounds of this invention, which contain acetoxy, tert-butoxy and SiC-bonded alkyl groups be prepared at a pressure of 1 bar or about 1 bar. However, if desired these silicon compounds may be prepared at higher or lower pressures as well.

The silicon compounds obtained from the reaction of an alkyltriacetoxysilane with tert-butanol in the presence of aqueous acetic acid generally contain low-molecular weight silanes which are mixed with a small amount of alkyltriacetoxysilane and low-molecular weight siloxanes which contain acetoxy, tert-butoxy and SiC-bonded alkyl groups.

The silicon compounds obtained from the reaction of an alkyltriacetoxysilane, tert-butanol and aqueous acetic acid are preferably used in an amount of from 1 to 15 percent by weight and more preferably from 3 to 8 percent by weight, based on the total weight of the composition which cures to an elastomer.

Examples of condensation catalysts which may be employed, if desired, are metal and organometallic salts, especially tin and organotin salts of carboxylic acids, such as di-n-butyltin diacetate, di-n-butyltin dilaurate and dibutyltin salts of aliphatic carboxylic acids which are branched in the alpha position in relation to the carboxyl group and which contain from 9 to 11 carbon atoms per molecule.

Examples of additives other than condensation catalysts which may be employed are solvents which are, for example, used as diluents for the condensation catalyst, such as benzene, toluene, xylols or perchloroethylene, reinforcing and/or non-reinforcing fillers, pigments, soluble dyes, resin-like organopolysiloxanes, including those containing $(CH_3)_3SiO_{\frac{1}{2}}$ and $SiO_{4/2}$ units, organic resins, homo or copolymers of acrylonitrile or polyvinyl chloride powder, corrosion inhibitors, oxidation inhibitors, heat stabilizers, agents for improving the adhesion of the elastomers to a substrate, such as gamma-glycidyloxypropyltriethoxysilane, plastizers, such as trimethylsiloxy endblocked dimethylpolysiloxanes, which are liquid at room temperature, or phosphoric acid esters, ultraviolet light absorbers and cell-generating agents such as azodicarbonamide.

Examples of reinforcing fillers, i.e., fillers having a surface area of at least 50 $m^2/g$, are especially pyrogenically prepared silicon dioxides, silicic acid-hydrogels which were dehydrated while maintaining their structure and other varieties of silicon dioxide having a surface area of at least 50 $m^2/g$ as well as metal oxides such as titanium oxide, ferric oxide, aluminum oxide and zinc oxide, provided they have a surface area of at least 50 $m^2/g$.

Examples of non-reinforcing fillers, i.e., fillers having a surface area less than 50 $m^2/g$ are quartz meal, diatomaceous earth, Neuburg Chalk, calcium silicate, zirconium silicate, calcium carbonate, for example, in the form of ground chalk, calcined aluminum silicate and powdery sodium aluminum silicate having molecular sieve properties.

Fibrous fillers such as asbestos and glass fibers, especially those having an average length up to about 0.5 mm and/or organic fibers may be used.

The inorganic reinforcing and non-reinforcing fillers may have hydrophobic properties. The inorganic fillers may be treated with trimethylethoxysilane or stearic acid to impart hydrophobic properties thereto. If desired, the treatment may be carried out, for example, in a ball mill.

Mixtures of various reinforcing and/or non-reinforcing fillers may also be used.

When the compositions of this invention contain fillers, such fillers are preferably present in an amount of from about 5 to 50 percent by weight, based on the total weight of the organopolysiloxane and the filler.

The compositions of this invention may be prepared by mixing the various components in any desired sequence. It is preferred that the mixing take place at room temperature under anhydrous conditions. However, if desired, mixing may take place at higher temperatures, for example, in the range of from 35° to 150° C.

The normal water content of the air is generally sufficient to cause crosslinking of the compositions. However, if desired, crosslinking may be performed at temperatures which are lower or higher than room temperature, for example, in the range of from −5° to +10° C. and/or with water concentrations which exceed the normal water content of the air.

Elastomers prepared from these compositions adhere to a great variety of substrates, such as silicate-containing substrates such as glass, procelain, crockery or enamel, as well as wood or metals, such as aluminum, in the absence of any treatment. Nevertheless, when some substrates such as metals, plastics and wood are pretreated with a primer, the adhesion of the elastomer is often improved.

The compositions of this invention may be used as sealants for fissures and similar cavities, for example, in buildings as well as land-based vehicles, ships and aircraft, and as adhesives or putties, for example, around windows, or for the manufacture of aquariums and showcases, and as protective coatings and as coatings which will resist sliding. The compositions may also be used in other applications for which compositions which cure at room temperature to form elastomers could have been used heretofore, such as for example, in the insulation of electrical or electronic devices or in manufacturing moldings having the elasticity of rubber.

EXAMPLE 1

(a) About 40 g of tert-butanol is added dropwise to 640 g of methyltriacetoxysilane with agitation. The mixture thus obtained is heated to 85° C. and mixed within 3 hours and under agitation with 48 g of a mixture containing 0.45 mole $H_2O$ and 0.14 mole of $CH_3COOH$. One hour later and while agitation is continued, the components which boil at 16 mbar are distilled off at a distillation temperature of 110° C. The residue contains 65 percent by weight of acetoxy groups and 7 mole percent tert-butoxy groups and has the following physical properties:

viscosity: 13 $mm^2 \cdot s^{-1}$ at 25° C.
iodine color number: 1
density: 1,150 at 25° C.

When this liquid containing acetoxy, tert-butoxy and SiC-bonded methyl groups is mixed with methyl triacetoxysilane and cooled to $-10°$ C., no evidence of crystal formation is observed.

(b) About 8 g of the liquid containing acetoxy, tert-butoxy and SiC-bonded methyl groups which was obtained in accordance with (a) above is added at 100 mbar to a mixture containing 100 g of a dimethylpolysiloxane having terminal Si-bonded hydroxy groups and a viscosity of 78,000 mPa·s at 25° C., and 35 g of a trimethylsiloxy terminated dimethylpolysiloxane having a viscosity of 36 mPa·s at 25° C. About 13 g of silicon dioxide which was pyrogenically obtained in the gaseous phase and 2 drops of di-n-butyltin diacetate are then added to the mixture. The composition thus obtained may be stored under anhydrous conditions, but when exposed to atmospheric moisture at room temperature, crosslinks to form an elastomer. When the composition is placed in tubes and stored for one year under anhydrous conditions, the viscosity remains substantially unchanged.

EXAMPLE 2

(a) The procedure described in Example 1(a) above is repeated except that 680 g of ethyltriacetoxysilane is substituted for the methyltriacetoxysilane. A sample of the liquid thus obtained containing acetoxy, tert-butoxy and SiC-bonded ethyl groups shows no evidence of crystal formation at $-10°$ C.

(b) The procedure described in Example 1(b) above is repeated except that 8 g of the product obtained from the procedure described in Example 2(a) above is substituted for the product obtained in Example 1(a) above. When the composition is placed in tubes and stored under anhydrous conditions, it shows no evidence of change after being stored for one year.

What is claimed is:

1. A curable composition which is stable under anhydrous conditions but when exposed to moisture at room temperature, cures to an elastomer comprising a diorganopolysiloxane having terminal condensable groups and a silicon compound containing acetoxy, tert-butoxy and SiC-bonded alkyl groups, in which at least a portion of the silicon compound containing acetoxy, tert-butoxy and SiC-bonded alkyl groups is obtained from the reaction of an alkyltriacetoxysilane with tert-butanol in the presence of aqueous acetic acid.

2. The curable composition of claim 1, wherein a condensation catalyst is added to the curable composition.

3. The curable composition of claim 1, wherein in the prepation of the silicon compound the amount of tert-butanol is from 0.16 to 0.2 mole per mole of alkyltriacetoxysilane; the amount of aqueous acetic acid is from 0.35 to 0.7 mole of $H_2O$ per mole of alkyltriacetoxysilane; and the amount of acetic acid in the aqueous acetic acid is from 0.1 to 2 mole of $CH_3COOH$ (anhydrous) per mole of water.

4. The curable composition of claim 1, wherein the diorganopolysiloxane is represented by the formula $HO(SiR_2O)_n SiR_2OH$ where R is selected from the group consisting of monovalent hydrocarbon radicals, substituted monovalent hydrocarbon radicals and polymeric hydrocarbon radicals and n is a number of at least 10.

5. A cured elastomer obtained from the composition of claim 1 upon exposure to moisture.

6. A method for preparing a composition which is stable under anhydrous conditions, but when exposed to moisture at room temperature cures to an elastomer which comprises mixing a diorganopolysiloxane having terminal condensable groups with a silicon compound containing acetoxy, tert-butoxy and SiC-bonded alkyl groups, in which at least a portion of the silicon compound is obtained from the reaction of an alkyltriacetoxysilane and tert-butanol in the presence of aqueous acetic acid.

7. The method of claim 6, wherein a condensation catalyst is incorporated therein.

8. The method of claim 6, wherein in the preparation of the silicon compound the amount of tert-butanol is from 0.16 to 0.2 mole per mole of alkyltriacetoxysilane; the amount of aqueous acetic acid is from 0.35 to 0.7 mole of $H_2O$ per mole of alkyltriacetoxysilane; and the amount of acetic acid in the aqueous acetic acid is from 0.1 to 2 mole of $CH_3COOH$ (anhydrous) per mole of water.

9. A method for curing the composition of claim 1, which comprises exposing the composition to atmospheric moisture.

10. A method for curing the composition of claim 2, which comprises exposing the composition to atmospheric moisture.

* * * * *